R. P. FRIST.

Assignor, by mesne assignments, to the DELAWARE HARD FIBRE COMPANY.

MANUFACTURE OF RODS OF PARCHMENTIZED FIBER.

No. 11,173. Reissued June 30, 1891.

Witnesses

Sidney P. Hollingsworth

Baltus L. Long

Inventor

Robert P. Frist by Baldwin, Davidson & Wight

Attorneys

THE NORRIS PETERS CO., PHOTO-LITHO., WASHINGTON, D. C.

UNITED STATES PATENT OFFICE.

ROBERT PORTER FRIST, OF WILMINGTON, DELAWARE, ASSIGNOR, BY MESNE ASSIGNMENTS, TO THE DELAWARE HARD FIBRE COMPANY, OF SAME PLACE.

MANUFACTURE OF RODS OF PARCHMENTIZED FIBER.

SPECIFICATION forming part of Reissued Letters Patent No. 11,173, dated June 30, 1891.

Original No. 424,876, dated April 1, 1890. Application for reissue filed May 19, 1891. Serial No. 393,359.

*To all whom it may concern:*

Be it known that I, ROBERT PORTER FRIST, a citizen of the United States, residing at Wilmington, in the county of New Castle and State of Delaware, have invented certain new and useful Improvements in the Manufacture of Rods of Parchmentized Fiber, of which the following is a specification.

The object of my invention is to produce from parchmentized fiber perfectly true cylindrical rods of any desired diameter or length, which object I attain in the manner hereinafter set forth, reference being had to the accompanying drawings, in which—

Figure 1:
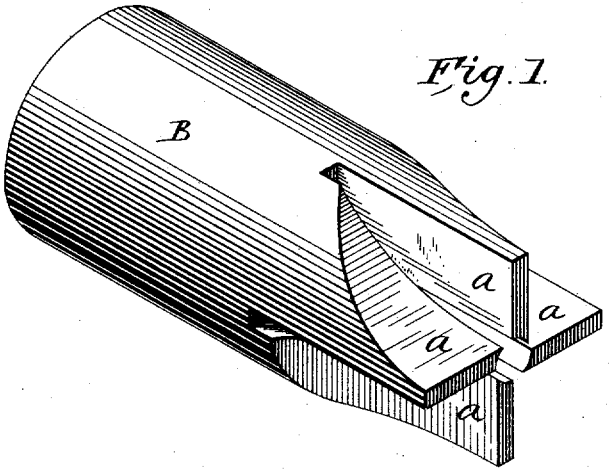
Figure 2:
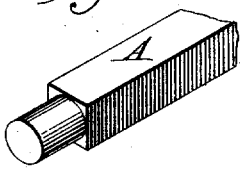
Figure 3:
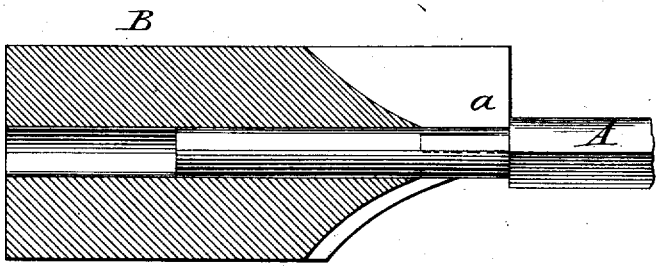
Figure 4:
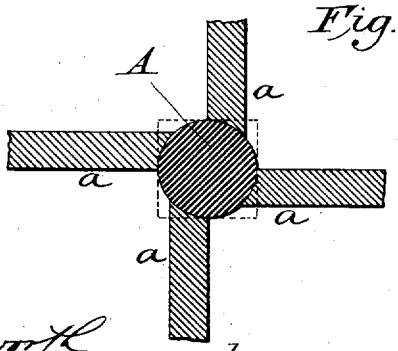

Figure 1 is a perspective view of a tool which may be used in carrying out my invention. Fig. 2 is a similar view of a partially-turned bar of parchmentized fiber, illustrating the way in which the rod is formed. Fig. 3 is a vertical central longitudinal section through the tool, with a partially completed rod therein, showing the action of the tool, Fig. 1, upon the bar; and Fig. 4 represents an end view or cross-section upon a larger scale, showing the polygonal portion of the bar in dotted lines.

My invention is intended for making cylindrical rods of that class of chemically-treated fibrous material known in the market under the various names of "kartavert," "leatheroid," "parchment paper," "vulcanized fiber," &c., all of which may be grouped under the general name of "parchmentized fiber."

Hitherto much difficulty has been experienced in making perfectly true cylindrical rods of such material, for it cannot be turned in an ordinary lathe, owing to its tendency to spring or yield under the lateral pressure of the turning-tool, and thus prevent the production of a true cylinder.

Attempts have heretofore been made to produce the desired result by subjecting a bar of polygonal cross-section to the action of rollers to reduce it to a cylindrical form; but this method has proved ineffective, as such rods are of varying density, and tend approximately to resume their original polygonal form.

In order to obviate the above-recited objections, in carrying out my invention I first produce a bar A of a polygonal cross-section approximating that of the rod to be produced, and cut off the projecting corners or angular portions of the bar by means of cutting blades or tools acting at points equidistant from each other around the circumference of the bar, at one end of which the cutting operation begins and progresses along the bar to the other end.

The tool shown in Fig. 1 consists of a hollow stem or mandrel B, reduced at the front end so as to form four cutting-blades *a*, located equidistantly from each other around the axis of the tool, the inner faces of these blades being concave, so that, as the tool acts upon the bar A to reduce it to a cylindrical form, said cylindrical portion will fit snugly to and will be firmly supported at equidistant points by the curved inner faces of the cutting-bits *a*, and at all points beyond them by the cylindrical bore of the tool, as shown in Figs. 3 and 4, thus preventing any deflection of the rod or bar which is being acted upon and insuring the absolute trueness of the cylinder thus produced.

A rod of any desired length can thus be produced, as it can pass through the mandrel, the cylindrical bore of which extends entirely through it, as shown in Fig. 3, and supports and holds that portion of the rod passing through it in correct alignment.

Having thus fully described my improvements in the manufacture of rods of parchmentized fiber, what I claim therein as new and as of my own invention, and desire to secure by Letters Patent, is—

1. The mode herein described of producing cylindrical rods of parchmentized fibrous material, said mode consisting in first producing a bar of said fibrous material of polygonal cross-section and of a size approximating that of the cylindrical rod desired and then removing the projecting corners or angular portions of this bar by a cutting operation commencing at one end thereof, performed simultaneously at equidistant and opposite points around its circumference, and continuing progressively along it, substantially as specified.

2. The mode herein described of producing cylindrical rods of parchmentized fibrous material, said mode consisting in first producing a bar of said fibrous material of polygonal cross-section and of a size approximating that of the cylindrical rod desired and then removing the projecting corners or angular portions of this bar by a cutting operation commencing at one end thereof, performed simultaneously at equidistant and opposite points around its circumference and continuing progressively along it, and supporting the completed portion of the rod on all sides and in correct alignment during the cutting operation, substantially as specified.

In testimony whereof I have hereunto subscribed my name this 2d day of May, 1891.

ROBERT PORTER FRIST.

Witnesses:

W. H. STANHOPE,

H. A. HARMAN.